United States Patent [19]

Kennedy et al.

[11] Patent Number: 5,066,440

[45] Date of Patent: Nov. 19, 1991

[54] PROCESS FOR MAKING AN INSULATED BUILDING BLOCK

[75] Inventors: Francis A. Kennedy; John P. Neff, both of Williamsville; Kenneth J. Blake, East Aurora, all of N.Y.

[73] Assignee: Thermalock Products, Inc., North Tonawanda, N.Y.

[21] Appl. No.: 605,576

[22] Filed: Oct. 29, 1990

Related U.S. Application Data

[63] Continuation-in-part of Ser. No. 433,842, Nov. 9, 1989, Pat. No. 4,986,049.

[51] Int. Cl.[5] .......................... B28B 1/10; B28B 7/00; B29C 43/04; B29B 13/00

[52] U.S. Cl. ........................................ 264/69; 264/71; 264/246; 264/247; 264/271.1; 264/274; 264/275; 264/279; 264/33; 264/336; 52/743; 52/309.12; 52/405

[58] Field of Search ..................... 52/743, 744, 309.11, 52/309.12, 405, 570, 612; 264/69, 71, 246, 247, 271.1, 274, 275, 279, 333, 336

[56] References Cited

U.S. PATENT DOCUMENTS

| | | | |
|---|---|---|---|
| 1,241,144 | 9/1917 | Parsons | 264/71 |
| 1,422,579 | 7/1922 | Kent | 264/247 X |
| 1,513,801 | 11/1924 | Camp | 264/71 |
| 1,668,590 | 5/1928 | Hilfreich | 264/247 |
| 2,781,549 | 2/1957 | Milne | 264/275 X |
| 4,185,434 | 1/1980 | Jones | 52/405 |
| 4,188,760 | 2/1980 | Frost | 52/405 |
| 4,551,959 | 11/1985 | Schmid | 52/309.12 |
| 4,604,250 | 8/1986 | Ecker | 264/225 X |

FOREIGN PATENT DOCUMENTS

| | | | |
|---|---|---|---|
| 1423393 | 9/1988 | U.S.S.R. | 264/271.1 |

*Primary Examiner*—David A. Scherbel
*Assistant Examiner*—Deborah McGann Ripley
*Attorney, Agent, or Firm*—Howard J. Greenwald

[57] ABSTRACT

A process for preparing a building block is described. In the first step of the process, an integral, substantially serpentine insert with a density of from about 1 to about 2 pounds per cubic foot is disposed within a mold. Thereafter, a cementitious material is placed in the mold around the insert and then press until the material within the mold has a density of from 80 to 150 pounds per cubic foot. The block thus formed is then removed from the mold and heated at a temperature of from about 75 to about 250 degrees Fahrenheit.

15 Claims, 11 Drawing Sheets

FIG. 19
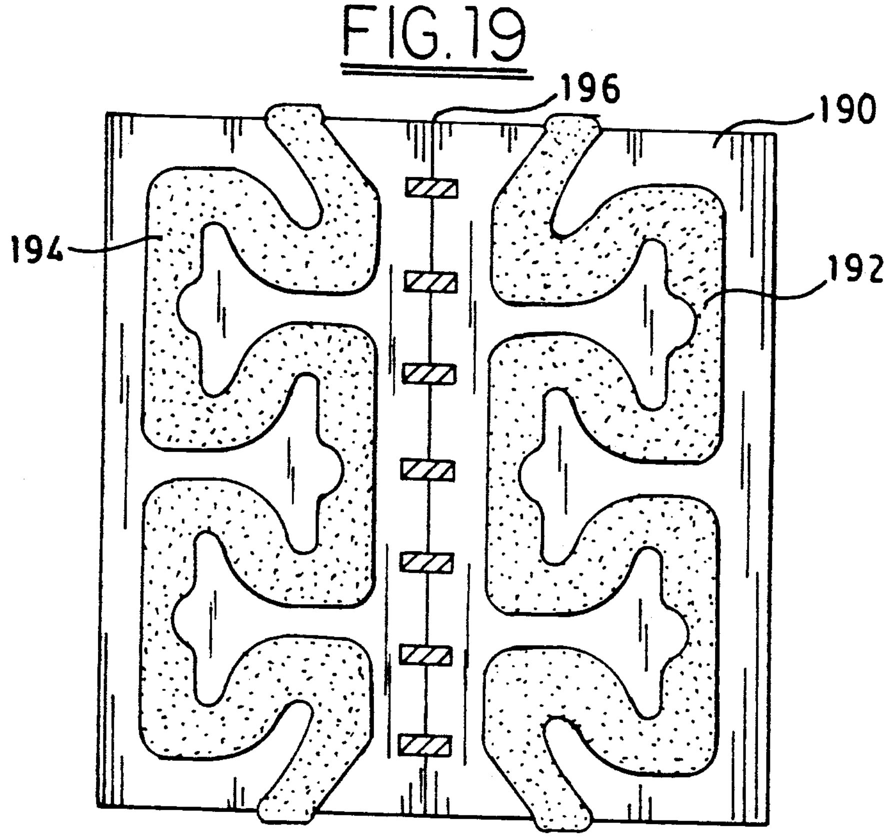
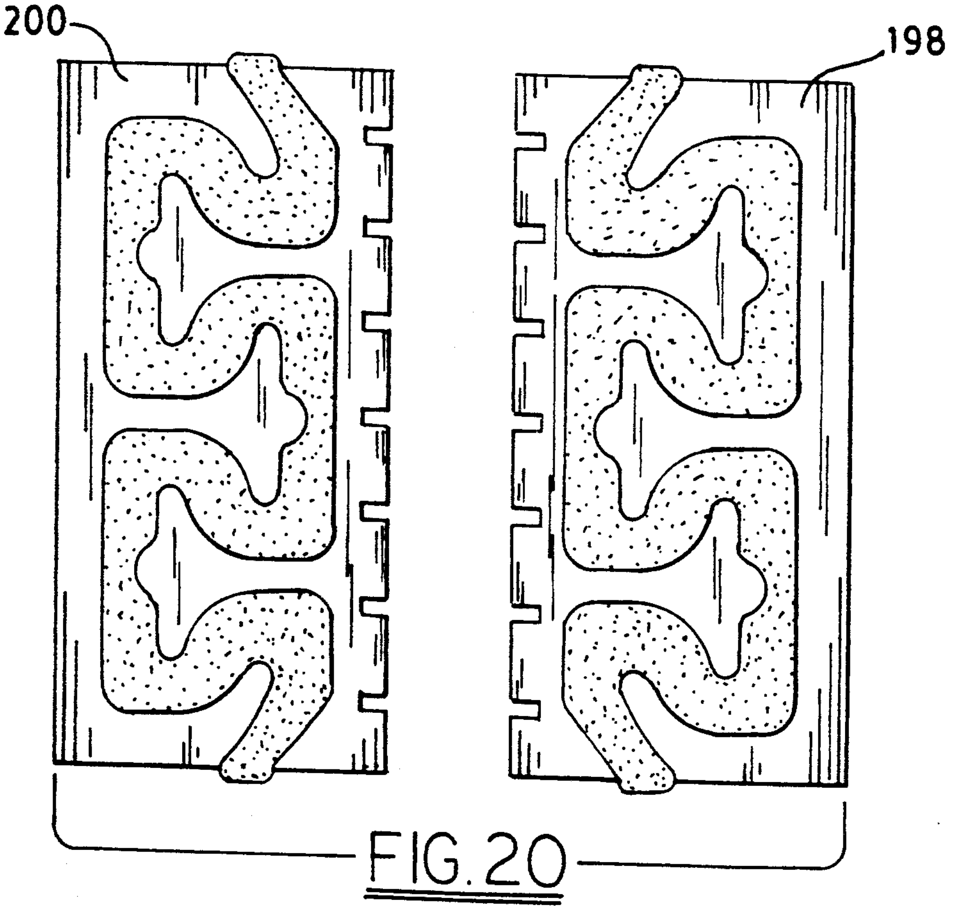
FIG. 20

PROCESS FOR MAKING AN INSULATED BUILDING BLOCK

CROSS-REFERENCE TO RELATED PATENT APPLICATION

This application is a continuation-in-part of applicants' application U.S. Ser. No. 07/433,842, filed Nov. 9, 1989, now U.S. Pat. No. 4,986,049.

FIELD OF THE INVENTION

A process for preparing a building block which contains two interlocking block parts separated from each other by an insulating material.

BACKGROUND OF THE PRIOR ART

U.S. Pat. No. 4,551,959 of Schmid discloses a building block with two spaced supportive parts separated from one another by a quantity of insulating material positioned between the parts. At column 2 of his patent, Schmid discloses that his insulating material 54 is foamed in place. He states that: ". . . to assemble the block 10 with foam in place insulation, the block parts . . . are initially arranged in their desired spaced relation relative to one another and subsequently held in such relation while the insulating material, in its uncured condition, is directed into the space between the block parts . . . . After filling the space with the foam insulation and allowing it to cure to a hardened condition, any excess insulation can be cut or trimmed away as desired."

The process of the Schmid patent is not commercially practical. In the first place, the foam material, prior to the time it is cured, acts as an adhesive; and the block-/foam structure thus tends to adhere to the pallet on which the block is sitting. In the second place, the rate of curing of the polyurethane foam is very dependent upon factors such as temperature, relative humidity, and barometric pressure; inasmuch as most block manufacturing plants do not carefully control these variables, it is difficult to consistently obtain building blocks having uniform properties with the process of Schmid. In the third place, where it is desired to have the foam extend beyond the surface(s) of the cement block, one must overfoam and subsequently cut the foam to size (a labor-intensive activity) and/or utilize a form which will help shape the foam to the required dimensions. In the latter instance, however, the foam tends to stick to the form.

In addition to the process of Schmid being commercially impractical and relatively expensive, the block produced by such process suffers from some major disadvantages. The two parts of the building block of the Schmid patent are held together by insulating material between such parts. When Schmid's block is subjected to conditions which will tend to degrade and/or weaken the insulating material (such as those one might encounter in a fire), the Schmid block will tend to lose its structural integrity.

It is an object of this invention to provide an insert which may be used to produce a building block.

It is another object of this invention to provide a process for preparing a building block which does not require that the block's insulating portion be foamed in place.

It is yet another object of this invention to provide a process for preparing a building block which does not require that excess insulator material be trimmed or cut from the formed block.

It is yet another object of this invention to provide a process for preparing a building block which produces a block with good structural integrity that does not contain thermally conductive webs or bridges between its wythes which allow the flow of heat from one wythe to another.

It is yet another object of this invention to provide a process for preparing a building block that will retain its structural integrity when the insulating material in it is weakened or destroyed.

It is yet another object of this invention to provide a process for preparing a building block which produces a block with improved sound insulating properties.

It is yet another object of this invention to provide a process for preparing a building block which produces a block with improved heat storage properties.

It is yet another object of this invention to provide a process for preparing a building block which produces a block which, when joined with mortar to building blocks of similar construction, will provide a construction wall which is less likely to crack when subjected to stress from earthquakes than prior art construction walls.

It is yet another object of this invention to provide a process for preparing a building block with improved moisture resistance.

It is yet another object of this invention to provide a structure comprised of the building block of this invention and at least one reinforcing rod.

It is yet another object of this invention to provide a process for the production of a building block which tends to resist the passage of Radon gas through its structure.

It is yet another object of this invention to provide a manufacturing process in which an insert may be used in place of a mold and the insert becomes an integral part of the molded product.

It is yet another object of this invention to provide an improved building block.

SUMMARY OF THE INVENTION

In accordance with this invention, there is provided a process for preparing an improved building block. In the first step of this process, a substantially serpentine, integral insulating material is provided. In the second step of this process, said insulating material is used as a mold to produce the building block of this invention.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 19 is a top view of a block prior to splitting which may be used to prepare one preferred embodiment of applicants' building block;

FIG. 20 is a ribbed building block made from the split block of FIG. 19.

DESCRIPTION OF THE PREFERRED EMBODIMENTS

Figure 1:
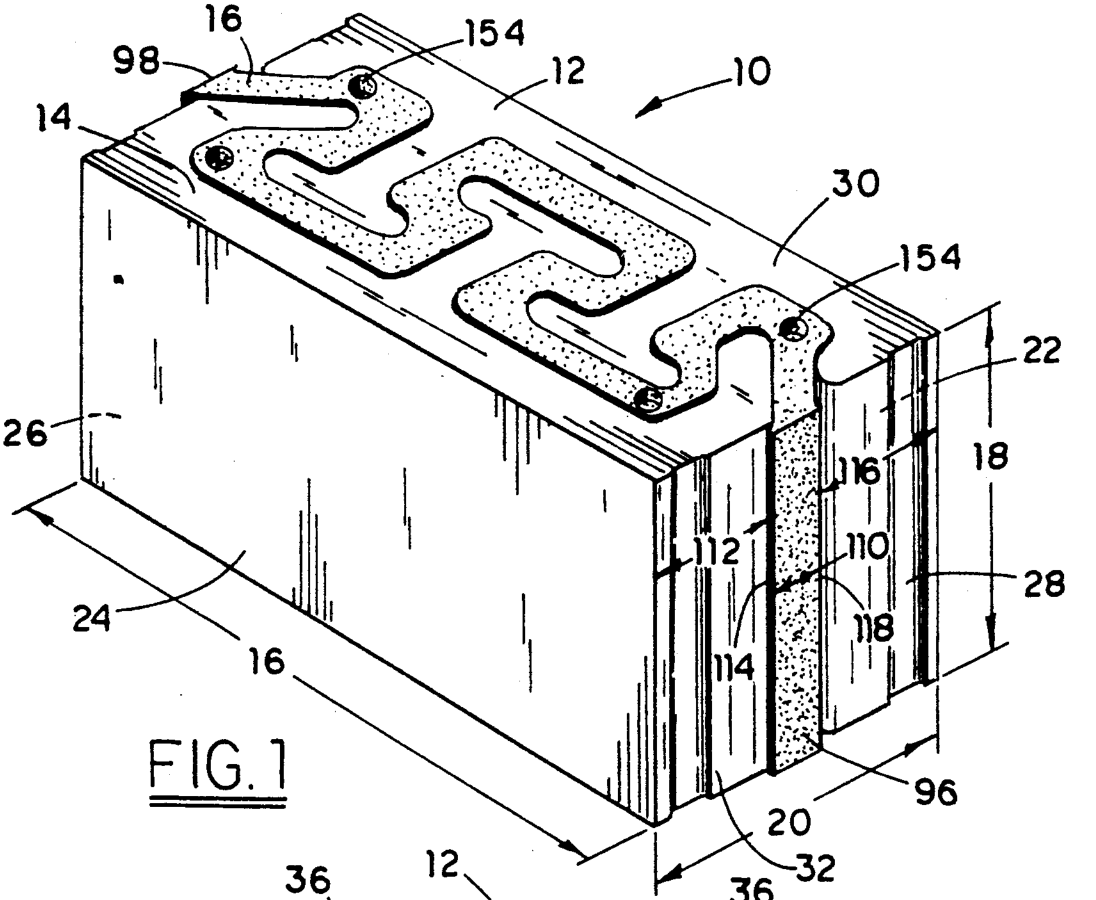
FIG. 1 is a perspective view of one of the preferred building blocks of applicants' invention.

FIG. 1 is a perspective view of one preferred embodiment of the building block 10 of applicants' invention. Building block 10 preferably has a rectangular shape and is comprised of two interlocking outer supportive parts, 12 and 14, and an inner insulating portion 16.

Outer supportive part 12 and outer supportive part 14 may be made by conventional means from any cementitious material, baked clay, or other material. It is preferred that outer supportive parts 12 and 14 be made from any cementitious material which acts as a bonding agent for materials.

In one embodiment, outer supportive parts 12 and 14 are made with a CINVA-Ram block press using a mixture of soil, sand, silt, clay, and cement; the press has a mold box in which a hand-operated piston compresses a slightly moistened mixture of soil and cement or lime. This process is described in, e.g., a publication entitled "Making Building Blocks with the CINVA-Ram Block Press," (Volunteers in Technical Assistance, Mt. Ranier, Md., 1977), the disclosure of which is hereby incorporated by reference into this specification.

In another embodiment, outer supportive parts 12 and 14 are made with a Besser Vibrapac V3R block machine (available from the Besser Manufacturing Company of Alpena, Mich.) with a hydraulic cement.

Hydraulic cements are produced by burning an intimate mixture of finely divided calcareous and argillaceous materials and grinding the resulting clinker to a fine powder, usually with gypsum to retard the set. The calcining process produces calcium silicates and calcium aluminates that can react chemically with water to form a hard, stone-like mass. When mixed with sand, coarse aggregate, and water, these cements produce mortars and concretes. See, e.g., pages 534 to 538 of Volume 4 of "The Illustrated Science and Invention Encyclopedia" (H. S. Stuffman Inc., Westport, Conn., 1983), the disclosure of which is hereby incorporated by reference into this specification.

In one preferred embodiment, outer supportive parts 12 and 14 each consist essentially of concrete. Concrete is a composite material composed of coarse granular material (the aggregate or filler) embedded in a hard matrix of material (the cement or binder) that fills the space between the aggregate particles and glues them together. Any of the concretes known to those skilled in the art may be used to prepare parts 12 and 14. Thus, by way of illustration and not limitation, one may use any of the concretes disclosed in S. Mindess' "Concrete" (Prentice Hall, Inc., Englewood Cliffs, N.J., 1981), the disclosure of which is hereby incorporated by reference into this specification.

The building block 10 is preferably sized on a multiple of 2 inches and preferably has the same dimensions of concrete blocks in common use; see, e.g., pages 179-181 of L. M. Detzettel's "Masons and Builders Library," Volume 1 (Macmillan Publishing Company, New York, 1986), the disclosure of which is hereby incorporated by reference into this specification.

In one embodiment, building block 10 has a length 16 of from about 15 to about 24 inches and, more preferably, from about 15.3 to about 15.8 inches. In this embodiment, the height 18 of building block 10 may be from 3.5 to about 9 inches (and, preferably, from about 7.4 to about 8.2 inches) or, alternatively, from about 3 to about 4.5 inches (and, preferably, from about 3.3 to about 3.8 inches). In this embodiment, the width 20 of building block 10 is from about 7 to about 14 inches and, preferably, from about 7.3 to about 7.8 inches. In another embodiment, not shown, width 20 may be from about 4 to about 12 inches.

Building block 10 preferably has two opposite planar sidewalls 22 and 24, two opposite planar ends 26 and 28, a planar top 30, and a planar bottom 32. The block sidewalls 22 and 24 are preferably parallel to each other, the block ends 26 and 28 are preferably parallel to each other, and the block top 30 and bottom 32 are preferably parallel to each other. The block sidewalls 22 and 24 are substantially perpendicular to the block top 30 and bottom 32. The block top 30 and bottom 32 are substantially perpendicular to the block ends 26 and 28.

It is preferred that endwalls 26 and 28 have substantially the same width, both of them preferably being from about 6 to about 12 inches. In one embodiment, each of endwalls 26 and 28 is 6 inches. In one embodiment, each of endwalls 26 and 28 is 8 inches. In one embodiment, each of endwalls 26 and 28 is 10 inches. In one embodiment, each of endwalls 26 and 28 is 12 inches.

Building block 10 is comprised of means for preventing the separation of outer supportive parts 12 and 14. Any means for preventing the separation of such parts 12 and 14 known to those skilled in the art may be used. Thus, by way of illustration and not limitation, one may use the means described in "Ingenious Mechanisms for Designers and Inventors," Volumes I, II, III, and IV (Industrial Press Inc., New York, 1978), the disclosures of which are hereby incorporated by reference into this specification.

In one preferred embodiment, each of outer supportive parts 12 and 14 are so shaped that they contain curvilinear interlocking structure associated with them; this embodiment is illustrated in FIGS. 2, 4, 5, 6, 7, 8, 9, 10, 14, 19, 20, and 21.

Figure 4:
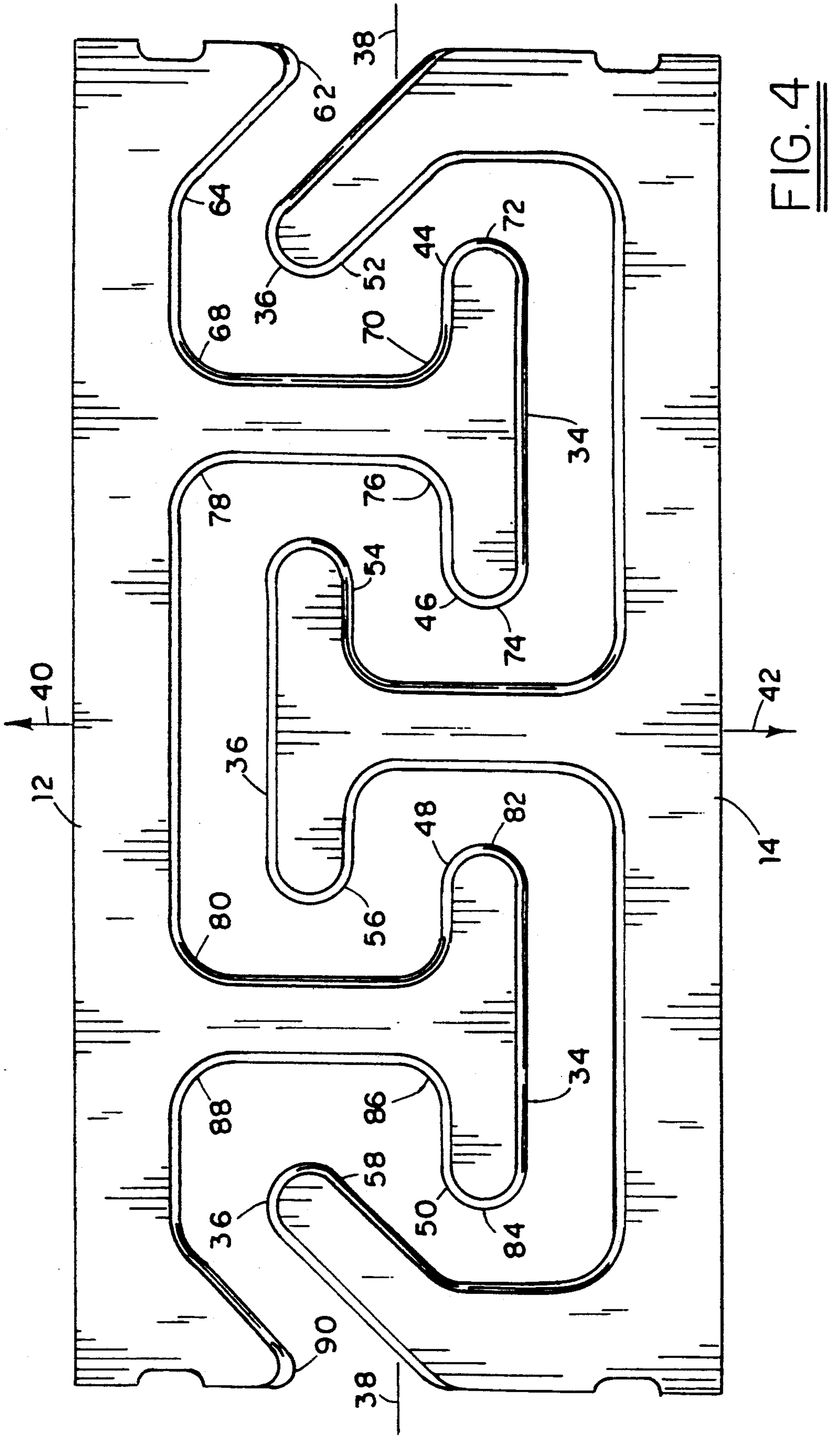
FIG. 4 is a top view of the interlocking block parts of the building block of FIG. 1 from which view, for the sake of illustration, the insulating material of the block of FIG. 1 has been omitted.

Referring to FIG. 4, each of outer supportive parts 12 and 14 are preferably integral pieces having at least one internal section, 34 and 36 respectively, so shaped to enable a portion of each of parts 12 and 14 to project within the confines of the other block part. Referring to FIG. 4, the centerline between block parts 12 and 14 is line 38. The projection(s) 34 extending from outer supportive part 12 projects past centerline 38 into the confines of block part 14, and the projection(s) 36 extending from outer supportive part 14 projects past centerline 38 into the confines of block part 12.

Outer supportive parts 12 and 14 are laterally interlockably connected to each other. When forces are applied in lateral directions 40 and 42 tending to pull parts 12 and 14 away from each other, these block parts 12 and 14 will travel only a certain distance until the interior surfaces of projections 34 and 36 contact each other and prevent further lateral movement. Thus, referring to FIG. 4, interior surfaces 44, 46, 48, and 50 of projections 34 will contact interior surfaces 52, 54, 56, and 58 of projections 36 and preclude further lateral movement of block parts 12 and 14.

Figure 9:
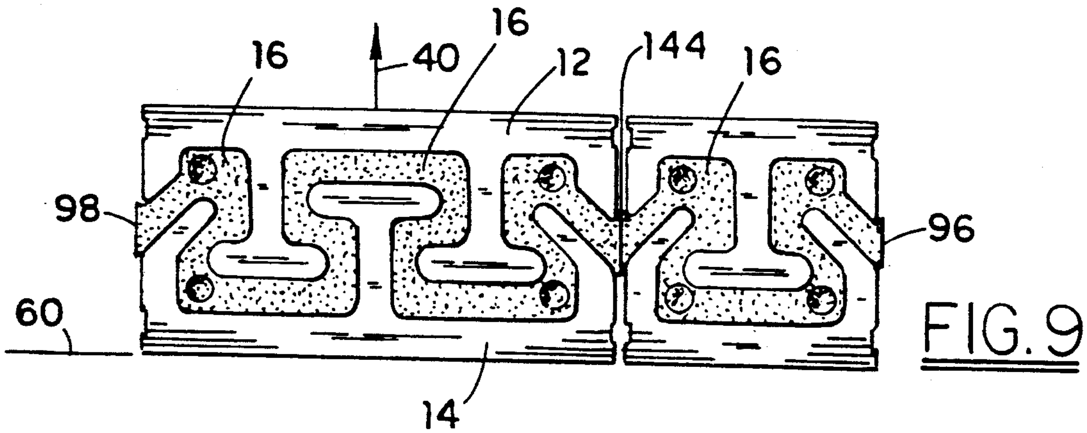
FIG. 9 is a top view of one means of joining the building block of FIG. 1 with the building block of FIG. 8.

The lateral interlocking of block parts 12 and 14 prevents the lateral separation of block 10 even after insulating portion 16 within the block has deteriorated or been destroyed. A simple test can be used to demonstrate this interlocking feature. Referring to FIG. 9, in this test building block 10 is placed upon a flat surface 60, and the insulating portion 16 is then removed from the block without disturbing the relative positions of block parts 12 and 14. The insulating portion 16 may be mechanically removed from the block. Alternatively, or additionally, it may be burned out of the block by heating the block for a time and temperature sufficient to vaporize most of the material in the insulating material. Other means of removing the insulating material will be apparent to those skilled in the art.

Once insulating material 16 has been removed from the block 10, force is applied to outer block part 12 to lift it in the direction of arrow 40 until it is at a height of 3.0 feet above surface 60. Because outer block parts 12 and 14 are still laterally interlockably connected even after insulative portion 16 has been removed, the lifting of part 12 above surface 60 will also result in the lifting of part 14 above surface 60.

FIG. 4 illustrates but one of many curvilinear, interlocking structures which may be used to laterally interlockably connect outer block parts 12 and 14; and other such structures will be readily apparent to those skilled in the art. One structure which it is preferred not to use, however, is disclosed in U.S. Pat. No. 4,185,434 of Jones, the disclosure of which is hereby incorporated by reference into this specification.

The Jones patent discloses a building block with a first parallel wall and a second parallel wall, each of which are formed on separate block parts 4 and 5, and each of which have internal sections 4' and 5', respectively. The internal sections 4' and 5' are shaped to enable a portion of one block part 4 to project within the confines of the other block part 5.

The edges of the internal sections 4' and 5' of the Jones patent are rectilinear, that is, they are characterized by and bounded by straight lines forming right angles. Thus, as is shown in FIG. 1 of Jones, each of the surfaces of internal sections 4' and 5' of the Jones block is defined by two straight lines which intersect to form a right angle.

Referring again to FIG. 4, it can be seen that the projections 34 and 36 used to interlockably connect block parts 12 and 14 are not rectilinear, that is, in no portion of these projections is a right angle defined by intersecting surfaces. By the same token, the insert 16 which fits within the space between the block parts also is not rectilinear but is curvilinear. The inner surfaces of building block 10, thus, preferably includes a multiplicity of corners, each of which is rounded. Thus, referring to FIG. 4, it will be seen, for example, that none of the intersecting surfaces 62, 64, 68, 70, 72, 74, 76, 78, 80, 82, 84, 86, 88, and 90 of projections 34 of block part 12 are rectilinear; each of these surfaces are curvilinear; they are formed, bounded, and characterized by curved lines.

Without wishing to be bound to any particular theory, applicants believe that the absence of rectilinear interior surfaces in their building block improves the fracture resistance of such block.

Figure 2:
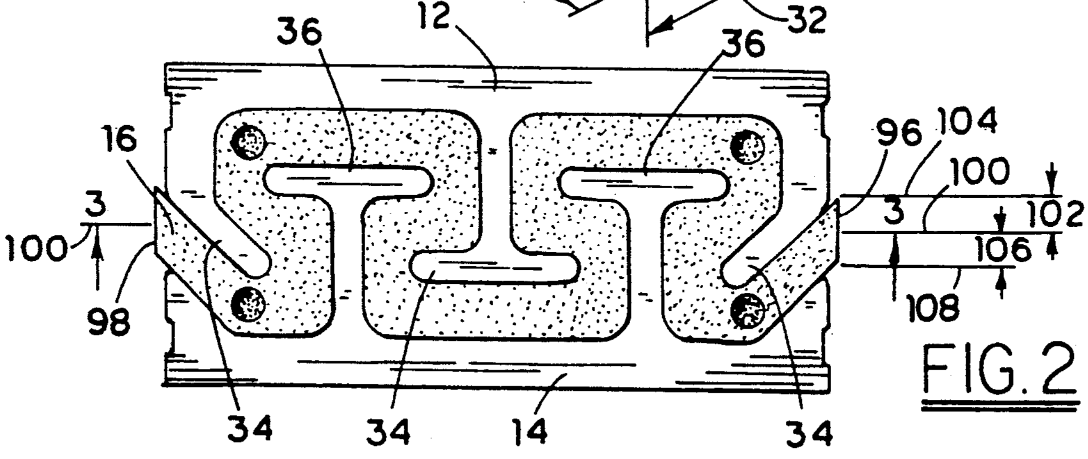
FIG. 2 is a top view of the building block of FIG. 1.
Figure 3:
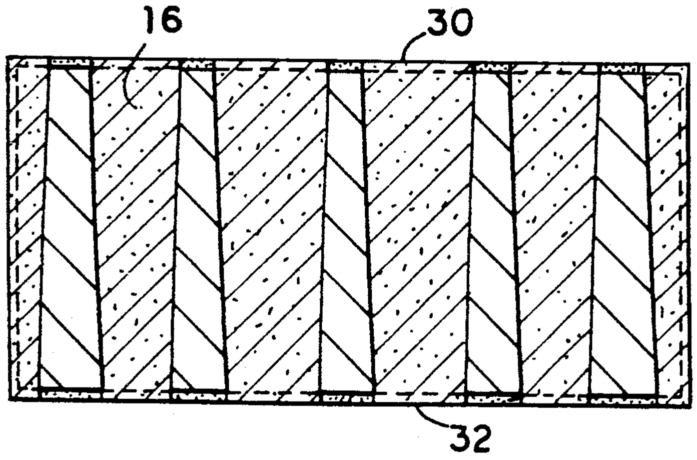
FIG. 3 is a cross-sectional view, taken along line 3—3 of FIG. 2, of the building block of FIG. 2.

FIG. 3 is a cross-sectional view of the preferred embodiment of FIG. 2 showing that, in this preferred embodiment, each of block parts 12 and 14 contains projections (34 and 36) which extend divergingly from the top 30 to the bottom 32 of block 10. It is preferred that such projections 34 and 36 extend both continuously and divergingly from the top 30 to the bottom 32 of block 10. Each of the projections is wider at the bottom 32 of the block than at its top 30; conversely, the insulating portion 16 is wider at the top 30 than at the bottom 32.

Figure 5:
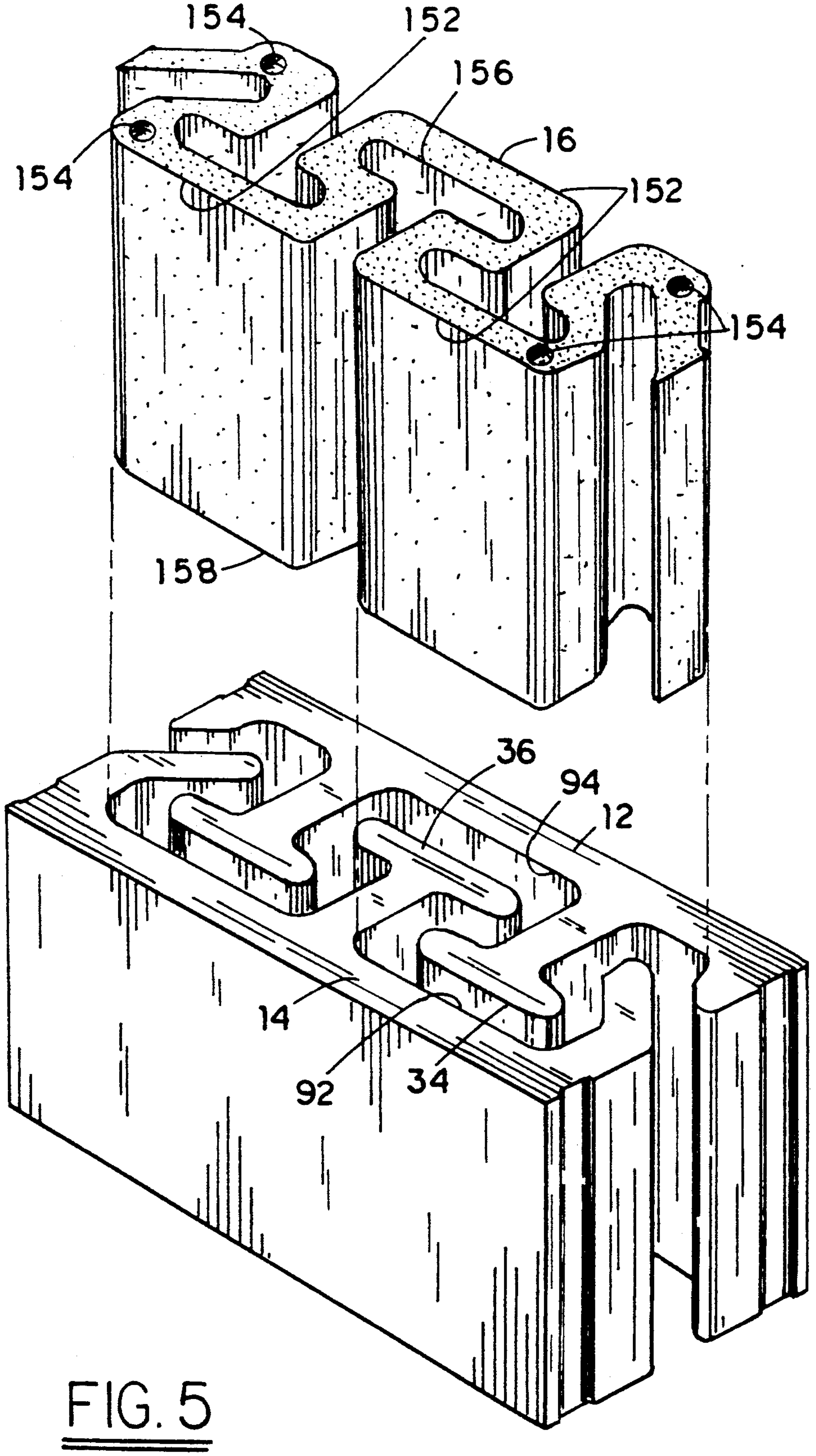
FIG. 5 is a perspective view of one preferred process of applicants' invention in which the insulating material of the building block of FIG. 1 is inserted between the interlocking block parts of said building block.

FIG. 5 illustrates one means of constructing the building block 10 of this invention. Referring to FIG. 5, it will be seen that each of outer supportive parts 12 and 14 may be disposed with regard to each other that the tops of projections 34 and 36 are separated from the interior opposing surfaces 92 and 94 of parts 14 and 12, respectively, by a distance approximately equal to or slightly larger than the top width of insulating material 16. Thereafter, insulating material 16 is inserted into and between block parts 12 and 14, snugly fitting into the wedge-shaped crevices formed by projections 32 and 34 and locking parts 12 and 14 together.

Because, in this embodiment, the insulating material 16 is preferably substantially wedge-shaped, it will make intimate contact with the interior walls of block parts 12 and 14 only after is has been substantially fully inserted into the space between said block parts.

In one preferred embodiment, not shown, insulating material 16 has a maximum width which is slightly less than the maximum space formed between the interior walls of block parts 12 and 14. In this embodiment, it is preferred that the maximum width of insulating material 16 be from about 0.95 to about 0.99 times as great as the maximum width of the space between such interior walls. In this embodiment, it is preferred that insulating material 16 be substantially uniformly undersized, being from about 0.5 to about 25 percent smaller than the corresponding space between the interior walls of the block parts.

In one preferred embodiment, not shown, the insulating portion 16 is both uniformly undersized (as defined above) and also contains one or more crushed ribs and/or projections. In this embodiment, the insert may be made by means well known to those skilled in the art. Thus, for example, one may score and/or mark the interior surface of the mold used to make the insert. The insert made from this mold will then contain a multiplicity of ribs and/or projections corresponding to the scores and/or marks made on the mold. It is preferred, in this embodiment, that the insert contain ribs which may (but need not) extend the entire length of the insert; thus, for an insert which is 8" long, the crushed ribs may be from about 7.5 to about 8.0 inches long. The width of the crushed rib (the distance it protrudes from the side of the insert) may be from about 0.063 to about 0.375 inches; as will be apparent to those skilled in the art, this width is a function of how deeply the mold is scored. The insert may have from about 1 to about 100 crushed ribs. Alternatively, or additionally, it may have from about 1 to about 100 projections.

The dimensions of the projections will vary depending upon how deeply one marks the interior surfaces of the mold. In general, the projections will have a depth of from about 0.01 to about 0.25 inches.

When the insert 16 contains from about 1 to about 100 crushed ribs and/or projections, it is preferred that its width be from about 0.95 to about 0.99 times the corresponding space between block parts 12 and 14. In this embodiment, the width of insert 16 is measured from opposing faces of the insert and does not take into account the width of the crushed ribs and/or projections. Thus, the insert itself is not substantially contiguous with the interior surfaces of the block parts, but the crushed rib(s) and/or the projection(s) are.

Without wishing to be bound to any particular theory, applicants believe that the air spaces created between the ribs of the insert and the walls of the building block tend to increase the insulating ("R") value of the building block.

Insulating portion 16 of building block 10 is preferably so dimensioned so that it extends slightly beyond the confines of endwalls 26 and 28, block top 30, and/or block bottom 32. Because of this feature, when one of building blocks 10 is joined to another of such blocks either endwall to endwall or top to bottom, a continuous thermal barrier is formed between the adjacent blocks. There is not thermal pathway through which heat can easily travel from one side of a wall built with building block 10 to another side of a wall built with building block 10.

Referring to FIG. 2, which is a top view of the building block of FIG. 1, it will be seen that insulating portion 16 preferably consists of an integral piece of insulating material and extends the entire length of the block 10 and beyond planar endwalls 26 and 28 of block 10. Ends 96 and 98 of insulating portion 16 preferably extends from about 0.1 to 0.4 inches beyond endwalls 26 and 28, respectively.

In another embodiment, the insulating portion 16 extends from about 0.2 to about 0.6 inches above the top of the block 10.

Two or more of building blocks 10 may be joined end to end by mortar to form a construction wall which contains a continuous barrier of insulation throughout the wall and provides no thermal path for the travel of heat from sidewall 22 to sidewall 24. This is accomplished because each of building blocks 10 has an insulating portion which extends slightly beyond the confines of both endwall 26 and endwall 28 so that, when two or more of such blocks are joined with mortar, a wall section is formed (see FIG. 10).

Building blocks 10 are preferably so constructed that, regardless of how one endwall of one block is joined with another endwall of a second block, the resulting structure will have a continuous barrier of insulation throughout it. Thus, endwall 26 of one block may be joined to endwall 28 of another block (see. e.g., FIG. 9); and this arrangement is a preferred embodiment. Alternatively, endwall 26 of one block may be joined to endwall 26 of another block, or endwall 28 of one block may be joined to endwall 28 of another block. Regardless of how endwalls 26 and 28 are connected to endwalls of similar blocks, the resulting construction wall will always contain a continuous thermal barrier, and there will be no direct thermal path between sidewalls 22 and 24. This feature is especially important when substantially unskilled labor is used to lay building blocks 10, for it makes it more difficult for such a laborer to install the block in a wrong manner.

In one embodiment (not shown) the name of the building block manufacturer (or of another entity) is inscribed onto the insulating insert 16 where it may be seen by a laborer after the insert has been connected to block parts. In this embodiment, all the laboror need do is to line up adjacent building blocks so that the names on such blocks all read in the same direction.

The ends 96 and 98 of insulating portion 16 which extend beyond walls 28 and 26, respectively, are preferably substantially at the center of said walls 28 and 26. Referring to FIG. 2, a centerline 100 can be drawn between sidewalls 22 and 24, and the portion of the insulating material 16 which extends beyond the endwall is preferably substantially centered on both sides of the centerline.

The term substantially centered, as used in this specification, means that at least some portion of end 96 and of end 98 is on each side of the centerline 100. Thus, referring to FIG. 2, the distance 102 between centerline 100 and the distal portion 104 of end 96 is preferably from about 0.25 to 4 times as great as the distance 106 between centerline 100 and the proximal portion 108 of end 96. Similarly, the distances between the distal and proximal portions of end 98 (not shown) and centerline 100 are preferably from about 0.25 to about 4 times as great as each other. It is preferred that the distances between the distal and proximal portions of ends 96 and 98 and the centerline 100 be from about 0.33 to about 3.0 times each other. In one embodiment, said distances are from about 0.4 to about 2.0 times each other.

In the preferred embodiment of FIG. 1, the thickness 110 of ends 96 and 98 at their midpoint of insulating portion 16 is preferably such that the distance 112 from wall 24 to the inner wall 114 of end 96 is from about 0.8 to about 1.2 times the distance 116 from wall 28 to the outer wall 118 of end 96. Similarly, the distance from wall 20 to the inner wall of end 98 is preferably from about 0.8 to about 1.2 times the distance from wall 18 to the outer wall of end 98.

The intersection of sidewalls 22 and 24 with endwalls 26 and 28, respectively, preferably defines a substantially 90 degree angle.

In one embodiment, not shown, insulating portion 16 has two mating ends which are adapted to fit together. In one embodiment, one of such ends may be male, and the other of such ends may be female. These mating ends are adapted to fit together and facilitate the joining of adjacent blocks. In one embodiment, one end has a substantially convex shape, and the other end has a substantially concave shape.

At the point at which ends 96 and 98 extend past the ends of walls 26 and 28, the width of insulating portion 110 at its midpoint is preferably from about 1 to about 3 inches and, more preferably, from about 1.25 to about 2.5 inches.

It is preferred that the ratio of the width of the insulating portion 16 at its midpoint and at the points at which ends 96 and 98 extend past the ends of walls 26 and 28, to the distance between sidewalls 22 and 24, be from about 0.10 to about 0.5. It is more preferred that said ratio be from about 0.15 to about 0.35. In a more preferred embodiment, said ratio is from about 0.16 to about 0.26.

Figure 6:
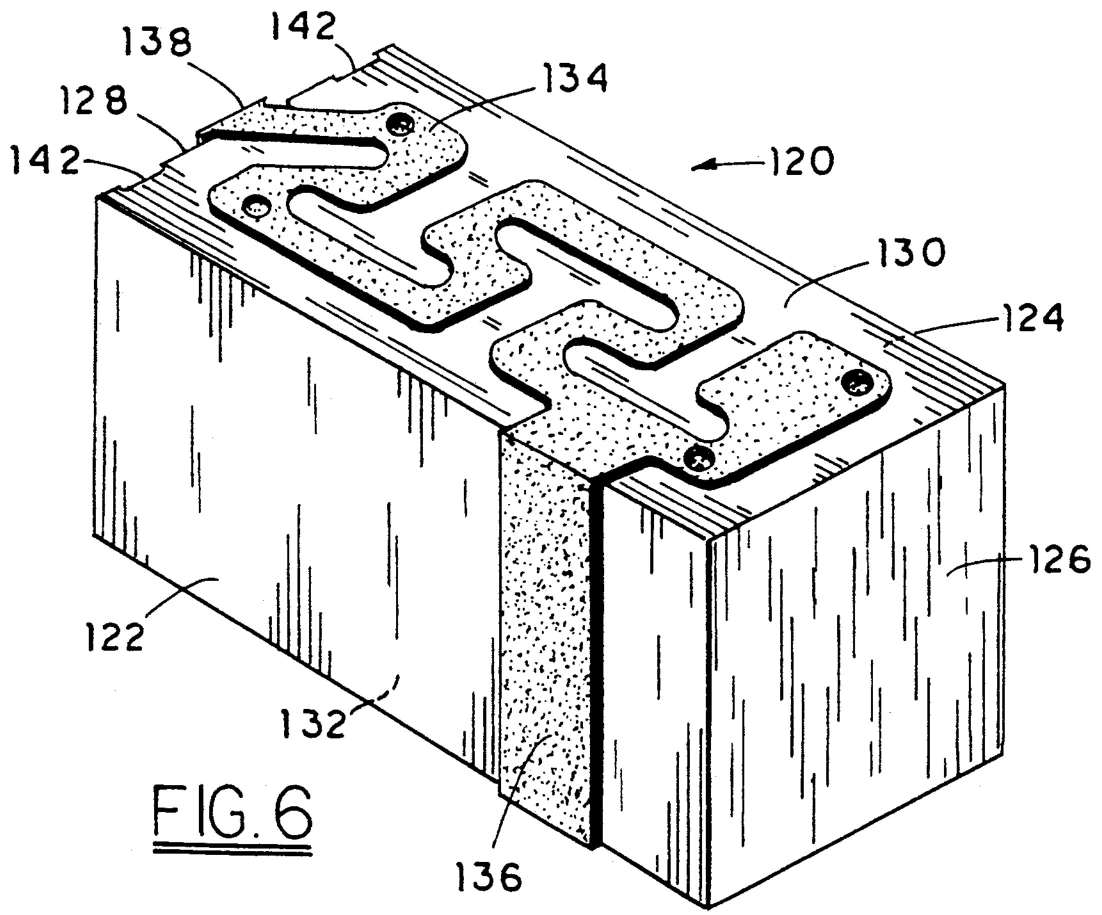
FIG. 6 is a perspective view of one preferred embodiment of a corner building block.

Referring to FIG. 6, there is shown an alternative building block, generally indicated as 120, which is suited for use at a corner of a wall construction. Building block 120 preferably has two opposite planar sidewalls 122 and 124, two opposite planar ends 126 and 128, a planar top 130, and a planar bottom 132. The block sidewalls 122 and 124 are preferably parallel to each other, the block ends 126 and 128 are preferably parallel to each other, and the block top 130 and bottom 132 are preferably parallel to each other. The block sidewalls 122 and 124 are substantially perpendicular to the block top 130 and bottom 132. The block top 130 and bottom 132 are substantially perpendicular to the block ends 126 and 128.

Insulating portion 134 is preferably an integral article extending from endwall 128 to sidewall 122. Insulating portion 134 preferably extends beyond planar walls 122 and 128. Ends 136 and 138 of insulating portion 134 preferably extends from about 0.1 to 0.4 inches beyond walls 122 and 128.

Figure 7:
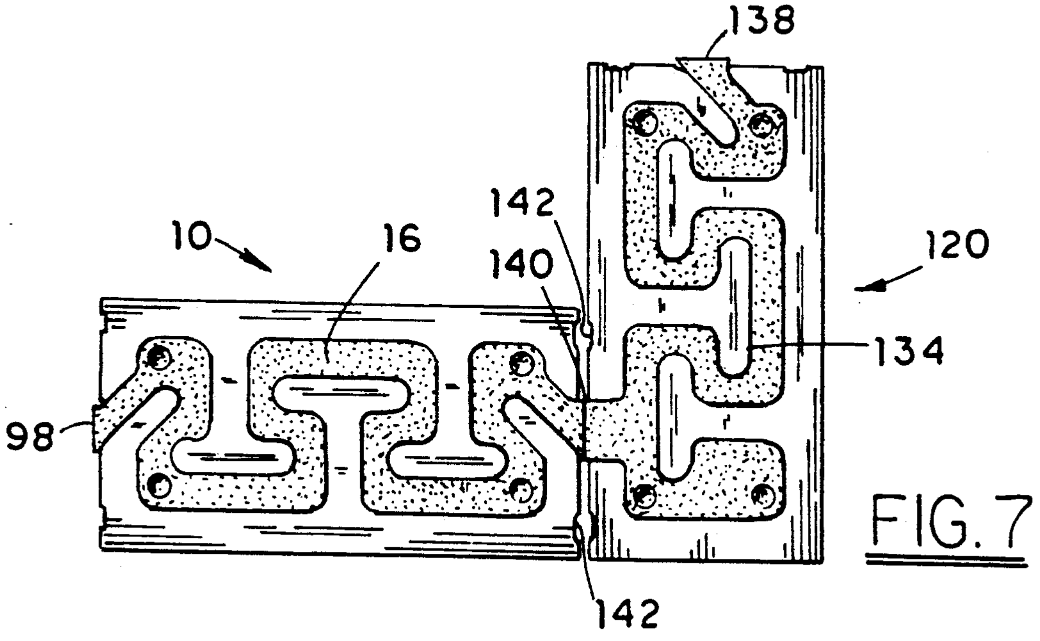
FIG. 7 illustrates one means of joining the building block of FIG. 1 with the building block of FIG. 6.

Referring to FIG. 7, the use of both block 10 and corner block 120 is shown. It should be noted that, at point 140, there is a continuous insulative path formed by the contact between insulating material 16 and insulating material 134.

Referring again to FIGS. 6 and 7, in the embodiments of the building blocks shown, mortar notches are provided which preferably extend the full height of block 10 and block 120.

Figure 8:
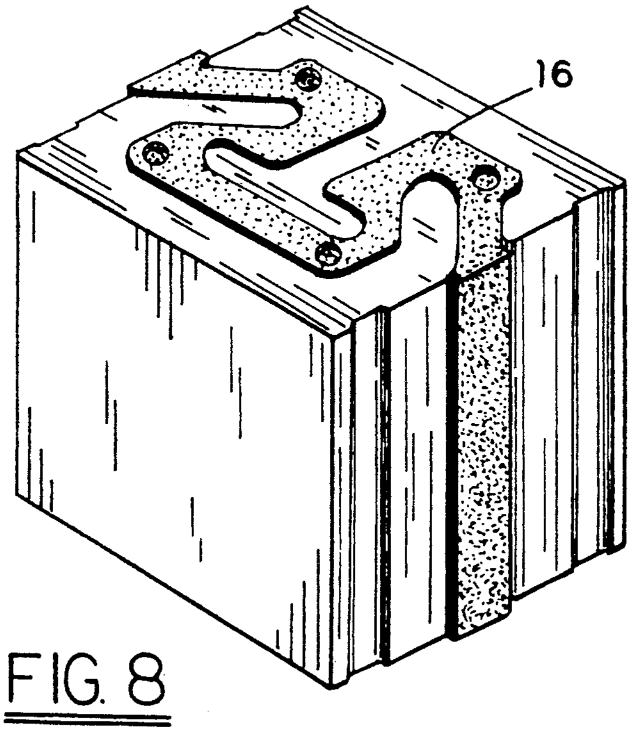
FIG. 8 is a perspective view of another embodiment of a half-block building block of this invention.

FIG. 8 illustrates another, smaller-sized version of the building block of FIG. 1. FIG. 9 shows one means of connecting the building block of FIG. 1 with the building block of FIG. 8. It should be noted that, at point 144, there is contact between the insulating portions 16, thereby providing a continuous insulating path.

Figure 10:
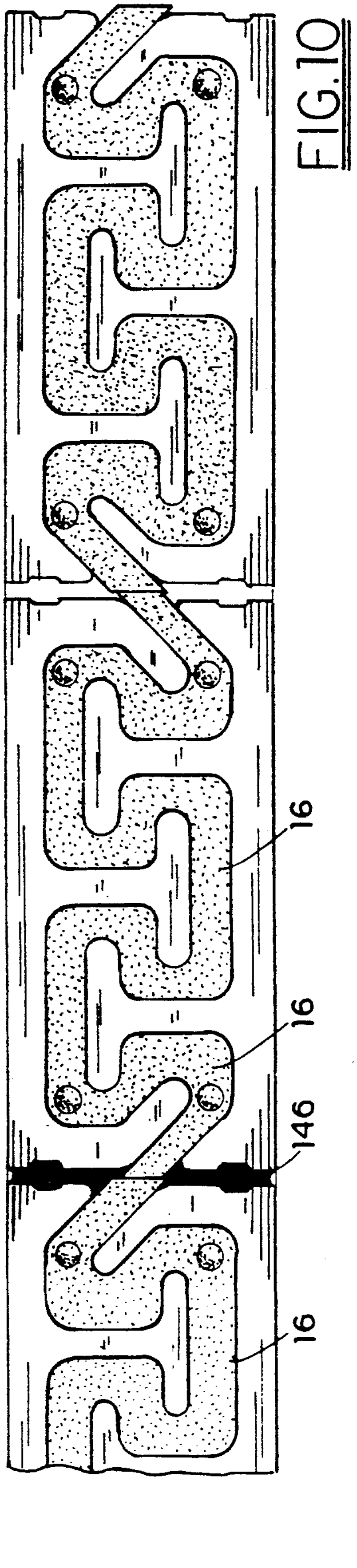
FIG. 10 is a top view of one means of joining two of the building blocks of FIG. 1.
Figure 11:
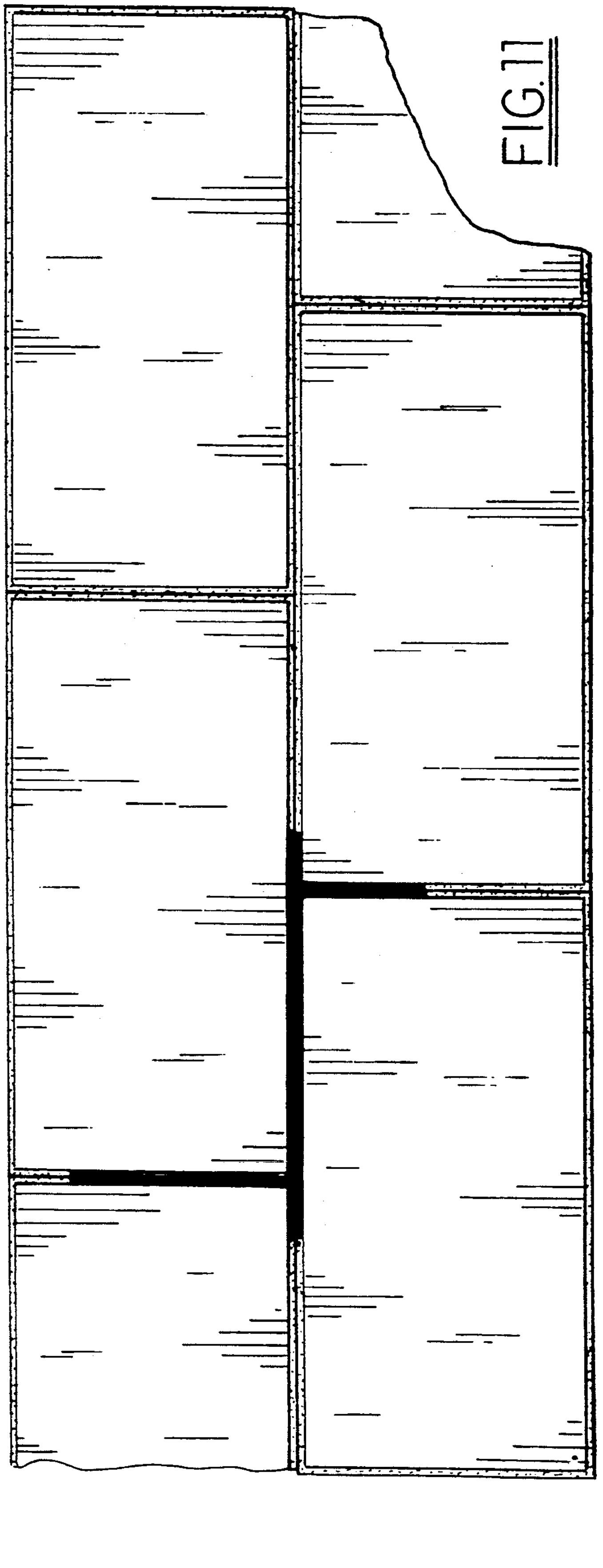
FIG. 11 illustrates a construction wall made from the building blocks of FIGS. 1 and 8.

FIG. 10 illustrates one embodiment in which mortar 146 connects two building blocks 10. In the embodiment depicted in FIG. 10, the middle block also may be connected to the two outer blocks after it has been rotated 180 degrees.

The building block 10 of this invention may be prepared with materials, machines, and processes well known to those skilled in the art. Thus, by way of illustration and not limitation, one means for preparing a lightweight building block 10 is described below.

In this preferred embodiment, one may use 1500 pounds of pumice, 2,500 pounds of sand, 530 pounds of 1-A cement, and water. The ingredients may be loaded into a mixer (available from Standly Batch Systems, Inc.) and mixed therein until a substantially homogeneous mixture is obtained. Thereafter, the mixture is then loaded into a hopper (available from Lithibar Matik, Inc.) which feeds the Besser block making machine described in a prior portion of this specification. The mixture is then shaken into a mold box (available from Rampf Mold Industries, Inc.) around a metal sinuous mold (available from ThermaLock Products, Inc. of North Tonawanda, N.Y.) which is adapted to form the mixture into the shapes of block parts 12 and 14. The mixture in the mold is then pressed and vibrated while in the mold to facilitate the settling of the mixture to the proper desired block height. The "green block" so formed in the mold is then removed from the mold and fired in a kiln (Johnson Gas Appliance Company) at a temperature of 180 degrees Fahrenheit for at least about 6 hours. Thereafter, the fired blocks are allowed to cool. Thereafter, as is shown in FIG. 5, insert 16 is pressed into place between fired block parts 12 and 14.

In another embodiment of the process, the sinuous mold used is insulating portion 16, which is fastened within the mold box prior to the time the mixture is poured therein. The structure thus formed, containing insulating material 16, is then pressed in a similar manner, the green body is removed from the mold box, and the green body is then fired at a temperature of from about 125 to about 200 degrees Fahrenheit and then cooled. This embodiment in is illustrated in FIGS. 15, 16, 17 and 18.

In this embodiment of the process of this invention, the insert 16 used is generally serpentine in cross-section, as viewed from its top and/or bottom. One may produce such a serpentine insert by any of the means well known to those skilled in the art. Thus, e.g., one may use a process similar to that described in U.S. Pat. No. 4,551,959 of Schmid to prepare a serpentine insert. Alternatively, such insert may be made by the process described below.

In one preferred embodiment, where the insert consists essentially of expanded polystyrene, the insert is made by a steam chest molding process in which beads of expandable polystyrene are exposed to heat in a confined space configured to produce the desired shape. The preferred medium is steam; it is directly diffused through the preexpanded beads in a mold cavity. See, e.g., pages 534–538 of Joel Frados' "Plastics Engineering Handbook," Fourth Edition (Van Nostrand Reinhold Company, New York, 1976), the disclosure of which is hereby incorporated by reference into this specification.

In one preferred embodiment, insert 16 is a wedge-shaped structure with inwardly extending sides which are wider at the top 156 of the insert than at the bottom 158 of the insert.

Figure 12:
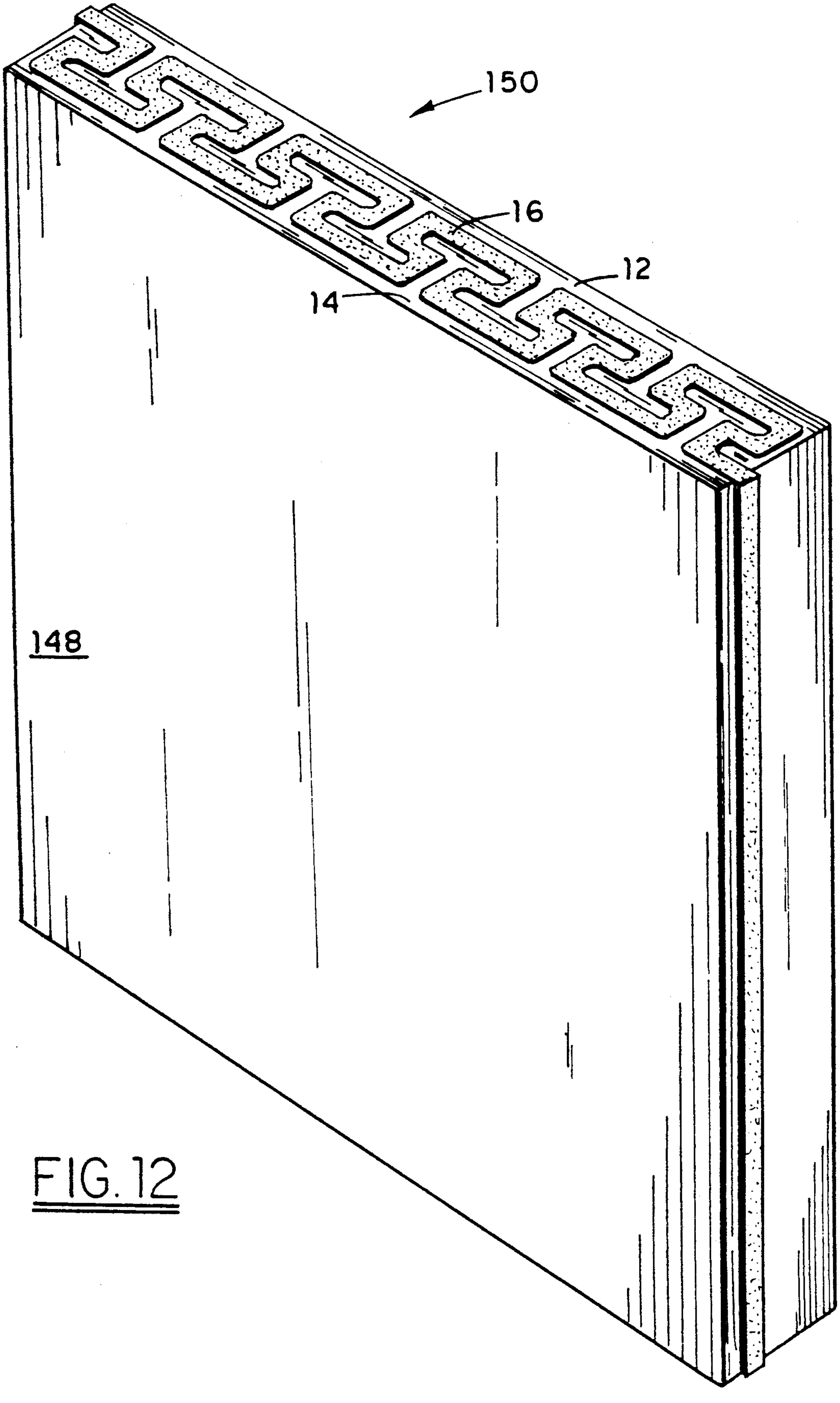
FIG. 12 illustrates a building panel.

Insert 16 is an integral, relatively lightweight structure adapted to form a multiplicity of interlocking projections with curvilinear structure. The term adapted to form, as used in this specification, refers to the shape of a mass which is poured into a mold around the insert. Thus, referring to FIG. 12, if insert 16 is placed into a rectangular mold 148 and concrete is poured into the mold and allowed to cure, a building panel 150 will be formed with interlockably connected building panel parts 12 and 14. Each of these building panel parts will have an interior interlocking shape defined by the exterior shape of the insert 16, and will contain a multiplicity of interlocking projections with curvilinear structure.

Referring again to FIG. 13, insert 16 is comprised of at least one projection 152 which is curvilinear. It also preferably is comprised of at least two thumb holes 154 which facilitate the lifting of building block 10 once the insert has been wedged into place between block parts 12 and 14. Insert 16 preferably consists of material with a density of from about 0.5 to about 4.0 pounds per cubic foot, a flexural strength of from 25 to 125 pounds per square inch and a shear strength from 25 to 175 pounds per square inch. In a more preferred embodiment, insert 16 consists of material with a density of from about 1.0 to about 3.0 pounds per cubic foot, a tensile strength of from about 27 to about 125 pounds per square inch, a compressive strength of from about 11 to about 92 pounds per square inch, a melting point not lower then about 140 degrees Fahrenheit and an R value of at least 3.5 R per inch. In an even more preferred embodiment, the material in the insert has a density of from about 1.0 to about 2.0 pounds per cubic foot, a tensile strength of from about 42 to about 80 pounds per square inch, a compressive strength of from about 20 to about 53 pounds per square foot, a melting point not less then 160 degrees Fahrenheit, and an R value of at least about 5.5 R per inch. Some of these properties are discussed on pages 180–181 of Volume 7 of the "McGraw Hill Encyclopedia of Science and Technology," supra, as well as in the references cited at the end of the article appearing in this document. Each of these publications is hereby incorporated by reference into this specification.

In one preferred embodiment, the foam material used is "STYOPOR", which is an expanded polystyrene bead material available from BASF Corporation of Parsippany, N.J. The polystyrene is expanded into a multicellular mass 42 times its original size. It has only one-sixth the weight of cork, but it will withstand hot water or temperatures above 170 degrees Fahrenheit.

By way of illustration and not limitation, the material in insert 16 may consist essentially of urea formaldehyde, phenol formaldehyde, polystyrene, phenolic resins, polyurethane foam, and the like.

In one embodiment, the material in insert 16 consists essentially of at least one foam material. The term foam, as used in this specification, refers to a material with a spongelike, cellular structure and includes materials such as polystyrene foam, polyurethane foam, flexible foamed thermoplastic elastomers, and the like. Reference may be had to, e.g., George S. Brady et al.'s "Materials Handbook," Twelfth Edition (McGraw-Hill Book Company, New York, 1986), the disclosure of which is hereby incorporated by reference into this specification.

Figure 15:
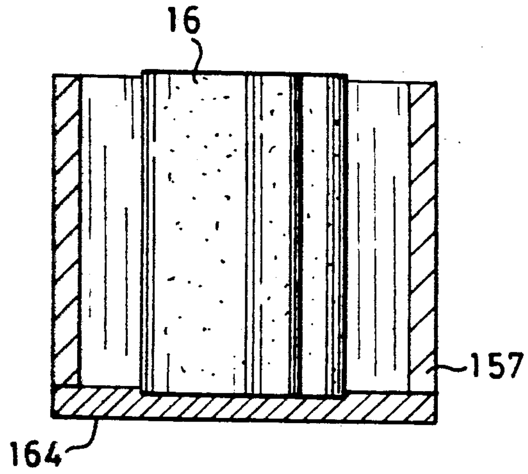
FIGS. 15, 16, 17, and 18 illustrate a process in which a cementitious mixture is poured over the insert of FIG. 13 to prepare applicants' building block.

Referring to FIG. 15, in the preferred process of this invention, insert 16 is disposed within a mold box. The mold box may contain one mold. Alternatively, it may contain a multiplicity of molds.

FIG. 15 is a cross-sectional view of one mold 157 in the mold box. Insert 16 may be disposed within the mold 157 so that it is substantially centered within mold 157. Alternatively, it may be so disposed that it is off-center.

In one embodiment, not shown, insert 16 is secured to mold 157 so that, when cementitious material is poured around it, it stays in the same position. One may secure insert 16 within mold 157 by means well known to those in the art such as, e.g., by holding the top of insert 16 with suitable holding means (such as pins, e.g.) during the pouring of the cementitious material. Other means for maintaining insert 16 in substantially one position within mold 157 also may be used.

Once insert 16 has been placed within mold 157 and secured therein, a mixture comprised of aggregate and a bonding agent is poured around insert 16.

The mixture which is poured around insert 16 is comprised of at least about 30 weight percent of aggregate. It is preferred that the mixture contain at least about 40 weight percent of aggregate. As is known to those skilled in the art, the term aggregate refers to one or more inorganic materials such as sand, gravel, clay, exploded shale, glass, pumice, granite, and the like.

In one preferred embodiment, the aggregate is exploded shale material which is sold under the tradename of "Haydite" by the Hydraulic Press Brick Company, Haydite Division, of Cleveland, Ohio.

In addition to the aggregate, the mixture which is poured around insert 16 also contains at least about 5 weight percent of cement (also known as Portland cement). It is preferred that the mixture contain at least about 10 weight percent of such cement.

The mixture poured around insert 16 also may contain other inorganic material such as, e.g., glass. In this embodiment, the glass used in the mixture preferably is so sized that substantially all of its particles have a largest dimension which is smaller than about 1.0 inch. In this embodiment, the glass may be used to replace some or all of the aggregate; thus, the total amount of aggregate plus glass in the mixture is at least about 30 weight percent.

By way of illustration and not limitation, one may use a mixture comprised of 1,300 pounds of exploded shale (sold as said "Haydite"), 1,400 pounds of limestone, and 335 pounds of Portland cement.

In another embodiment, the mixture poured around insert 16 is comprised of at least about 10 weight percent of fly ash.

Figure 16:
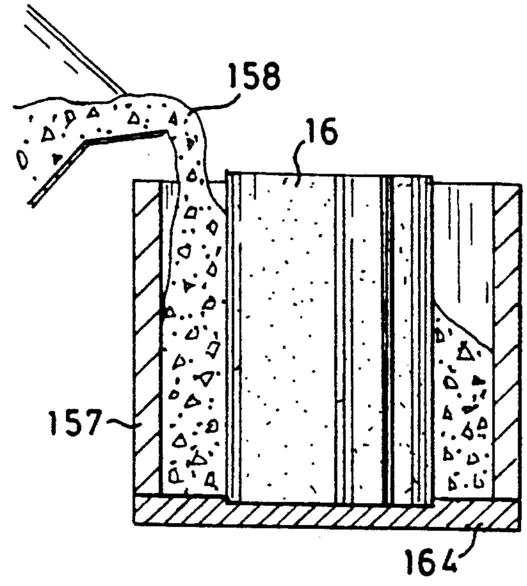

Referring to FIG. 16, the cementitious material 158 is poured around the insert 16. In one embodiment, illustrated in FIG. 16, such material is manually poured from a container. In another embodiment, not shown, cementitious material 158 is discharged from a hopper (not shown) into mold 157.

Cementitious material 158 is preferably poured into mold 157 until said material 158 substantially fills said mold. Then, as shown in FIG. 17, the cementitious material is pressed and/or agitated to help it settle within the mold 157.

Figure 17:
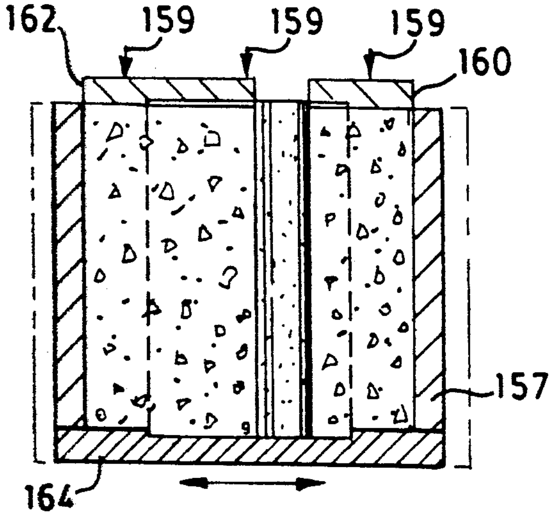
Figure 18:
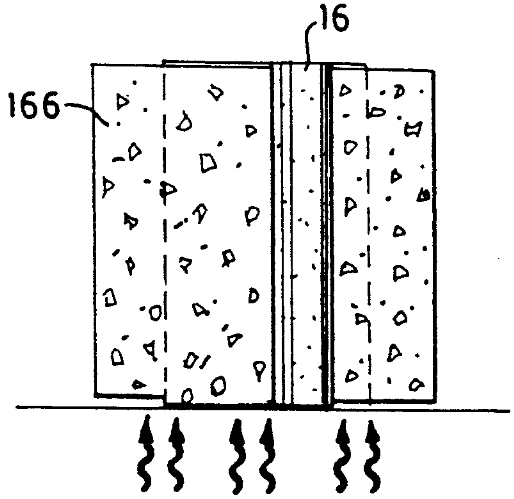

Referring to FIG. 17, pressure is applied in the direction of arrows 159 upon stripper shoes 160 and 162 until the density of all the materials within mold 157 is from about 80 to about 150 pounds per cubic foot. This pressure may be applied continuously, or it may be applied intermittently.

In one embodiment, not shown, the pressure is applied intermittently. In this embodiment, it is preferred to apply pressure to the mixture 158 through the stripper shoes for from about 3 to about 6 seconds.

In one preferred embodiment, while pressure is being applied to the mixture 158, said mixture is also agitated to help it settle within the mold.

The pressure and/or the agitation are preferably continued until (1) the density of the material within the mold box 157 is from about 80 to about 150 pounds per cubic foot, and (2) insert 16 extends above the material 158. It is preferred to compress the mixture 158 until the insert 16 extends at least from about 0.2 to about 0.6 inches above the material 158. It is more preferred to compress the mixture 158 until the insert 16 extends from about 0.3 to about 0.5 inches above the material 158.

After the material 158 has been compressed to the desired extent, the block is removed from mold 157 by means well known to those skilled in the art. Thus, it may be pressed out of the mold 157 by first removing the bottom 164 of the mold and then pressing the block 166 out of the mold. Alternatively, the block may be removed from the side or the front of the mold box.

The block 166 thus removed is then cured. The curing is effected by heating the block 166 to a temperature of from about 75 to about 250 degrees Fahrenheit for from about 4 to about 10 hours.

In one embodiment, illustrated in FIGS. 19 and 20, a split block 190 comprised of inserts 192 and 194 is split along line 196 to yield a ribbed, split-faced units 198 and 200. Thus, by this process, one may prepare an insulated building block of this invention which is three score, five score, three-wide score, etc. See, e.g., page 87 of "Bricklaying: Brick and Block Masonry: (Brick Institute of America, Reston, Virginia, 1988), the disclosure of which is hereby incorporated by reference into this specification.

The building block produced by the process of this invention, regardless of whether it has a split face or a relatively smooth face, may be coated with glaze. In one aspect of this process, block parts 12 and/or 14 are coated with glaze, heated to a temperature of about 1,100 degrees Fahrenheit for from about 1 to about 5 hours, and then joined by having insert 16 be inserted between their interior faces. Any of the glazes used to coat ceramic ware may be used to coat the building block of this invention.

In one embodiment of this invention, the face of the building block produced by the process of this invention is coated with an inorganic coating known to those in the trade as "MINERALITE" (a coating consisting of aggregate which is available from Mineralite Limited, Bridgewater House, Surrey, England.). The coating is an aggregate (such as granite and glass) mixed with cement and non-resinous additives. The additive is described in a publication entitled "Mineralite Covers The World" (published by Mineralite Ltd, Surrey, England, in 1986), the disclosure of which is hereby incorporated by reference into this specification.

In one preferred embodiment, a process is provided for making an insulated concrete block assembly which can be laid dry or with mortar joints. This process is described in U.S. Pat. No. 4,584,043 of Monte Riefler, the disclosure of which is hereby incorporated by reference into this specification.

In the first step of this process, there is provided at least one inner concrete block having upper and lower load bearing surfaces and inner and outer faces extending between said upper and lower surfaces. This inner concrete block may be substantially identical to the block depicted in FIG. 1 of this application.

In the second step of this process, there is provided at least one outer concrete block which is spaced from and registering with said inner block and which has upper and lower load-bearing surfaces. In this outer concrete block, the inner and outer faces extend between said upper and lower surfaces and a central crossweb extends between said upper and lower surfaces and has ends integral with said inner and outer faces. This outer concrete block, which is also often referred to as a facing block, is identified as block 2 in the aforementioned Riefler patent.

In the third step of this process, there is provided a board of insulating material which is sandwiched between and adhesively bonded to the outer face of said inner block and to the inner face of said outer block. This board has an upper edge registering with the upper surfaces of said blocks. The board, which may be polystyrene foam, is identified as element 3 in the Riefler patent.

In the fourth step of the process, there is provided a sheet metal tie. This tie is identified as element 12 in the Riefler patent.

In the fifth step of the process, said inner and outer blocks are conveyed along laterally separated paths to stops; a set of one inner and one outer block is positioned with the outer face of the inner block presented to and in register with, but laterally spaced from, the inner face of the outer block; said set of blocks is then conveyed past two sets of adhesive guns which apply adhesive to the blocks; the adhesive-laden blocks are then stopped in register with and laterally spaced from each other, with the adhesive coated faces facing each other; the board of insulating material is inserted between and in registry with said adhesive coated faces; the blocks are then pressed together to compress the board between the adhesive coated faces of the blocks; a spot of adhesive is then applied to the upper surfaces of each of the blocks; and the ends of the sheet metal tie are then pressed against the adhesive-laden spots.

The composite block produced by using applicants' novel building block as the inner block component is substantially, and unexpectedly, more insulating than the block of Riefler is.

In another embodiment of this invention, not shown, the insulating insert 16 is replaced by aerogel. As is known to those skilled in the art, aerogels are gel materials which are dried under high pressure and temperature and which produce one of the lightest solid materials. See, e.g., an article by James Dulley appearing the "Helpful Hints" section of the Oct. 13, 1990 issue of the Buffalo News, the disclosure of which is hereby incorporated by reference into this specification.

Figure 21:
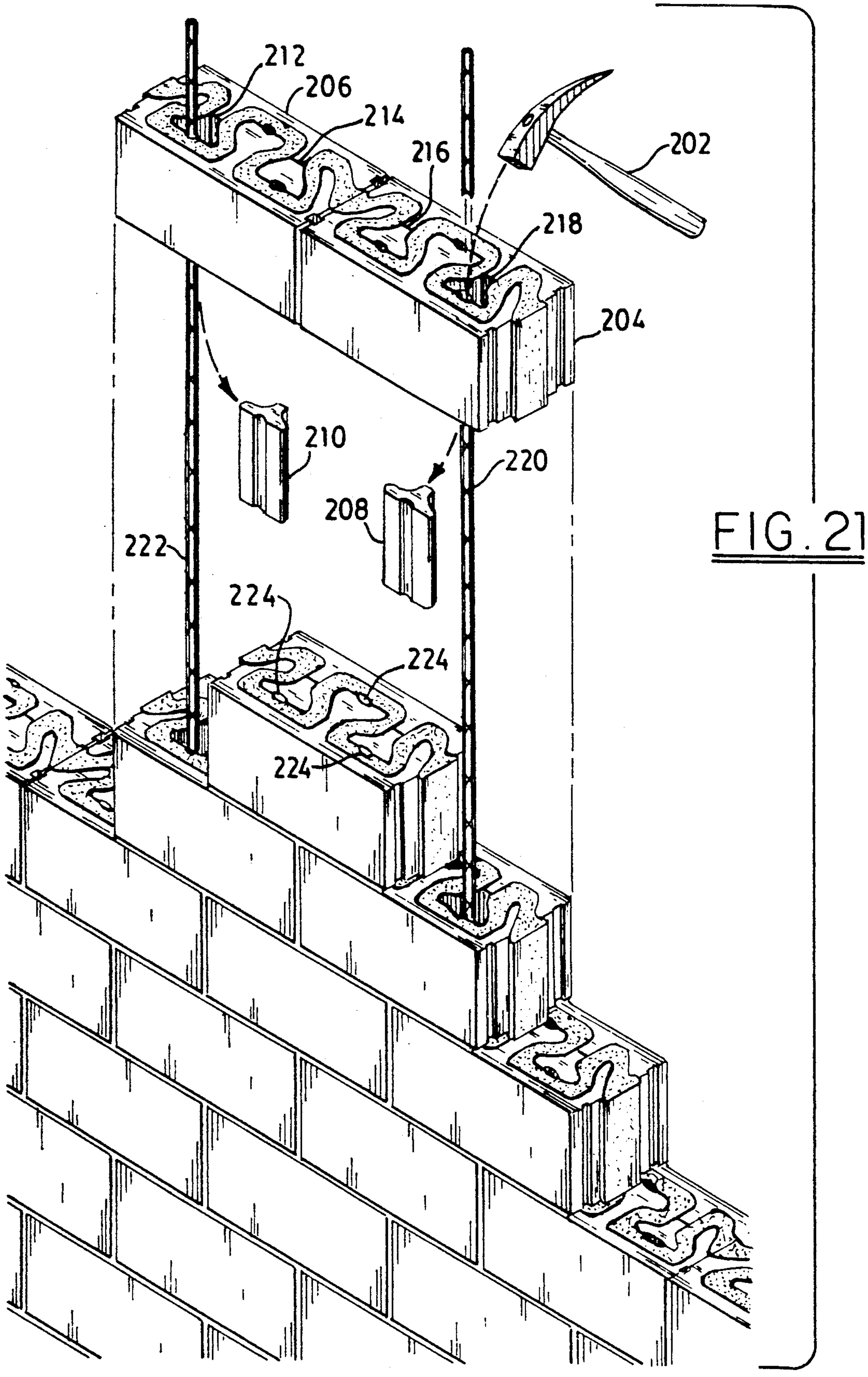
FIG. 21 illustrates a process for producing a building block structure comprised of reinforcing rods.

Another embodiment of this invention is illustrated in FIG. 21. In this embodiment, a wall structure with substantially improved strength properties is produced.

Referring to FIG. 21, hammer 202 (or another similar instrument) is used to break away from building blocks 204 and 206 knockouts 208 and 210. In order to facilitate the breaking away of knockouts 208 and 210 from the building blocks 204 and 206, the building blocks 204 and 206 may be scored at points where it is desired to cause the knockouts 208 and 210 to separate from the blocks. Thus, e.g., one of such scores is illustrated at each of points 212, 214, 216, and 218. Alternatively, other means may be used to facilitate the separation of the knockouts from the blocks.

In one embodiment, not shown, the building blocks are not so scored and reliance is had merely upon the force with which the hammer hits the blocks to cause the knockouts to separate.

The space created by the separation of the knockouts 208 and 210 may be filled with one or more retaining rods 220 and 222. As is illustrated in FIG. 21, these retaining rods may be passed through a multiplicity of building blocks which are offset from one course to the next.

After the retaining rods are placed through the orifices in the offset blocks, the blocks may be grouted. The blocks so grouted produce a wall structure which has a substantially greater lateral strength (to prevent wall flexure) than does a similar wall structure without the retaining rods.

In one embodiment, not shown, a three-pronged tong is used to carry, position, and/or move the building block of this invention. The three prongs of the tong are adapted to fit within the thumb holes 224 illustrated in FIG. 21 of this application. This tong allows a laborer to carry two of the building blocks of this invention at a time; and it also allows a mason to maneuver a block into its final position with one hand.

In another portion of this specification, applicants have described the preparation of the insert 16 with expandable polystyrene. In one aspect of this embodiment, an aluminum tub comprised of interior aluminum surfaces is used to shape the insert. Five projecting dies extend upwardly from the wall of the aluminum tub and, when in contact with the expandible polystyrene, define the curvilinear projections of insert 16. It is preferred that at least three of the five projecting dies be removably attached to the wall of the aluminum tub so that, if one desires to change the configuration of the insert 16, he may replace one set of dies with another.

In another portion of this specification, applicants have described a process in which the building block of this invention is made by first preparing two block parts 12 and 14 and then inserting insulating insert 16 therebetween. The two block parts 12 and 14 may be prepared by inserting a metal mold into a mold box and placing concrete around the mold. The metal mold may be made by a process in which a wooden pattern is made with substantially the same shape as insulating insert 16. Thereafter, this wooden pattern is placed in sand and then removed, thereby leaving a cavity with substantially the shape of insert 16. This cavity is then filled with molten metal which is thereafter allowed to cool, thereby forming the metal mold.

The following example is presented to illustrate the claimed process but is not to be deemed limitative thereof. Unless otherwise specified, all parts are in pounds by weight and all temperatures are in degrees Fahrenheit.

EXAMPLE 1

Figure 13:
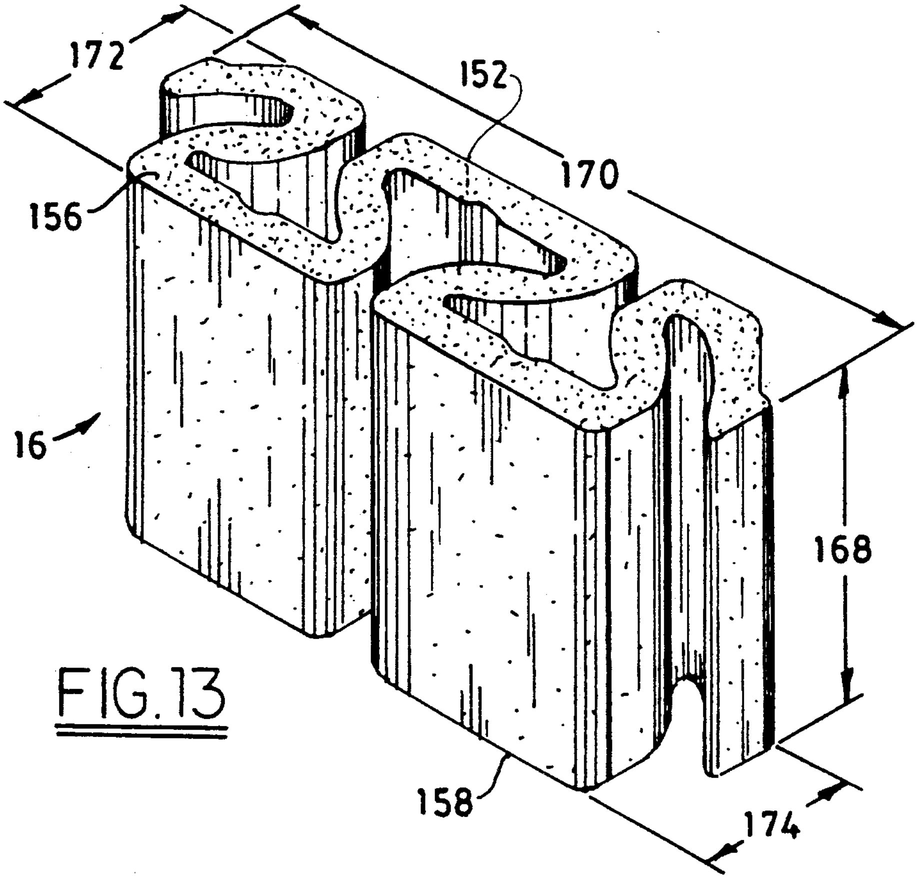
FIGS. 13 and 14 illustrate one preferred embodiment of the insert of this invention.
Figure 14:
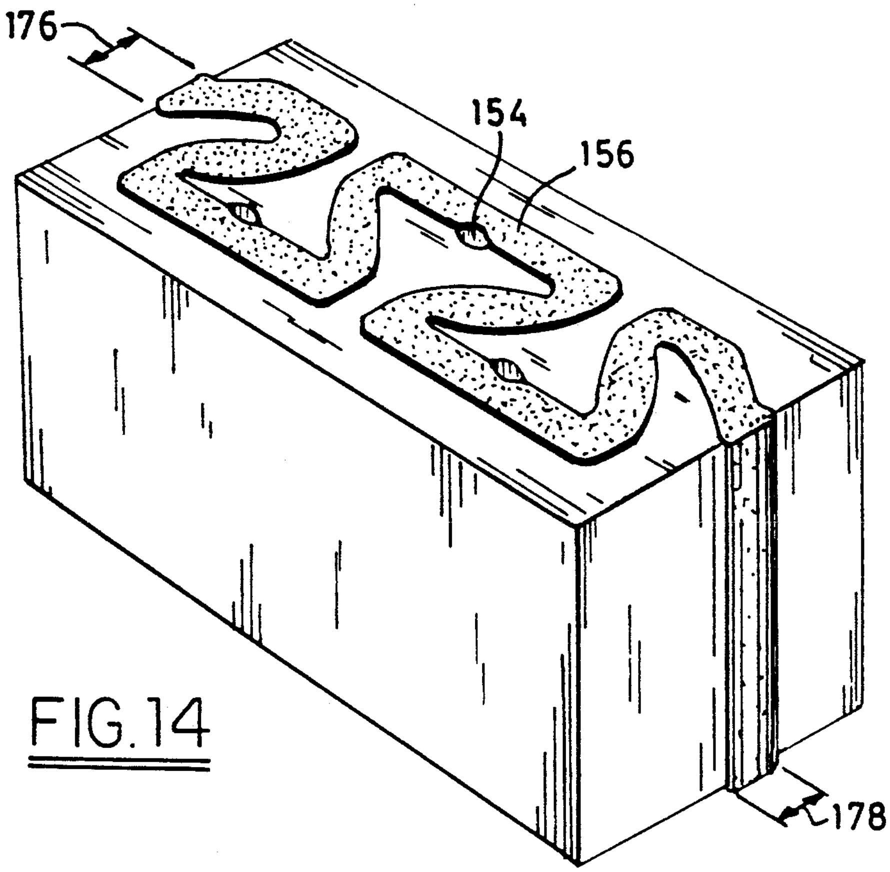

An insulating insert was prepared on a steam chest molding machine from expanded polystyrene with an density 1.5 pounds per cubic foot. The polystyrene was formed into a serpentine insert, with substantially the shape shown in FIG. 13. Referring to FIG. 13, this insert had a height 168 of 8.0 inches, a length 170 of 16 inches, a top depth 172 of 5.5 inches, a bottom depth 174 of 5.25 inches, a top wall thickness 176 of 1.3 inches, and a bottom wall thickness 178 of 1.0 inches.

1,300 pounds of exploded shale (sold as said "Haydite"), 1,400 pounds of limestone, 335 pounds of Portland cement, and water were mixed until a substantially homogeneous mixture was obtained.

The insert is disposed and centered within a rectangular mold which is 27 inches long, 20 inches wide, and 10 inches high. The shale/limestone/cement mixture is then poured into the mold until it is substantially level with the top of the insert. Thereafter, while the mold is vibrated, the cementitious mixture is pressed at a pressure of 300 pounds to compress the mixture until its density is 100 pounds per cubic foot. Thereafter, the block so formed is removed from the mold and heated at a temperature of 185 degrees Fahrenheit for 6 hours.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims. Thus, for example, one may use the aforementioned mold from ThermaLock Products, Inc. in the Besser Vibrapac V3R block machine to form the building block 10.

Thus, for example, one may use insert 16 as a mold component in the Besser Vibrapac V3R block machine to form the building block 10 directly.

What is claimed is:

1. A process for preparing a building block, comprising the steps of:

(a) providing a substantially serpentine, integral, insert adapted to form a multiplicity of interlocking projections with curvilinear structure, wherein:
   1. said insert is comprised of at least one projection which is curvilinear;
   2. said insert consists essentially of material with a density of from about 1.0 to about 2.0 pounds per cubic foot, a flexural strength of from 25 to 125 pounds per square inch, and a shear strength from 25 to 175 pounds per square inch;

(b) providing a substantially rectangular mold;

(c) disposing said insert within said mold;

(d) providing a cementitious material, wherein said material is comprised of at least about 30 weight percent of aggregate, and at least about 5 weight percent of cement;

(e) placing said cementitious material around said insert within said mold;

(f) pressing said cementitious material to form a block until said block has a density of from about 80 to about 150 pounds per cubic foot and until said insert extends beyond the top of said block by from about 0.2 to about 0.6 inches;

(g) removing said block from said mold; and (h) heating said block for from about 4 to about 10 hours at a temperature of from about 75 to about 250 degrees Fahrenheit.

2. The process as recited in claim 1, wherein said insert is wedge-shaped and is defined by walls which extend inwardly from the top of said insert to its bottom.

3. The process as recited in claim 2, wherein said insert is so disposed within said mold that it is substantially centered within said mold.

4. The process as recited in claim 3, wherein said aggregate is sand.

5. The process as recited in claim 3, wherein said aggregate is clay.

6. The process as recited in claim 3, wherein said aggregate is gravel.

7. The process as recited in claim 3, wherein said aggregate is exploded shale.

8. The process as recited in claim 3, wherein said aggregate is glass.

9. The process as recited in claim 3, wherein said aggregate is pumice.

10. The process as recited in claim 3, wherein said aggregate is granite.

11. The process as recited in claim 3, wherein said cementitious mixture contains at least about 10 weight percent of cement.

12. The process as recited in claim 11, wherein, while said cementitious material is being pressed, it is agitated.

13. The process as recited in claim 12, wherein said insert consists essentially of polystyrene.

14. The process as recited in claim 13, wherein said polystyrene has a tensile strength of from about 42 to about 80 pounds per square inch.

15. The process as recited in claim 13, wherein said insert has a compressive strength of from about 11 to about 92 pounds per square inch.

* * * * *